US012024325B2

(12) United States Patent
Deslandes et al.

(10) Patent No.: US 12,024,325 B2

(45) Date of Patent: Jul. 2, 2024

(54) PRESSURIZED GAS SOURCE

(71) Applicant: Coravin, Inc., Bedford, MA (US)

(72) Inventors: Sarah Deslandes, El Sobrante, CA (US); Michael Rider, Lowell, MA (US)

(73) Assignee: Coravin, Inc., Bedford, MA (US)

( * ) Notice: Subject to any disclaimer, the term of this patent is extended or adjusted under 35 U.S.C. 154(b) by 102 days.

(21) Appl. No.: 17/192,939

(22) Filed: Mar. 5, 2021

(65) Prior Publication Data

US 2021/0276748 A1 Sep. 9, 2021

Related U.S. Application Data

(60) Provisional application No. 62/986,038, filed on Mar. 6, 2020.

(51) Int. Cl.

*B65B 31/02* (2006.01)
*F17C 1/00* (2006.01)

(52) U.S. Cl.

CPC .............. *B65B 31/025* (2013.01); *F17C 1/00* (2013.01); *F17C 2201/0109* (2013.01); *F17C 2201/058* (2013.01); *F17C 2205/0308* (2013.01); *F17C 2221/013* (2013.01); *F17C 2270/0736* (2013.01)

(58) Field of Classification Search

CPC .................................................... B65B 31/025

See application file for complete search history.

(56) References Cited

U.S. PATENT DOCUMENTS

| | | | | |
|---|---|---|---|---|
| 5,056,676 | A | 10/1991 | Allen et al. | |
| 5,803,288 | A | 9/1998 | Munini | |
| 6,213,323 | B1 | 4/2001 | Ferrari | |
| 7,845,522 | B2 * | 12/2010 | Grill | B67D 1/0406 137/212 |
| 9,248,416 | B2 | 2/2016 | Striebinger | |
| 10,160,560 | B2 | 12/2018 | Schovain | |
| 2003/0131885 | A1 * | 7/2003 | Birtcher | B67D 7/0272 137/240 |
| 2014/0360971 | A1 | 12/2014 | Marino | |
| 2015/0201794 | A1 | 7/2015 | Hoffmann | |

FOREIGN PATENT DOCUMENTS

| | | |
|---|---|---|
| WO | WO 2007/145641 A1 | 12/2007 |
| WO | WO 2014/144873 A1 | 9/2014 |

OTHER PUBLICATIONS

Invitation to Pay Additional Fees for International Application No. PCT/US2021/021041, dated Jun. 28, 2021.

International Search Report and Written Opinion for International Application No. PCT/US2021/021041, dated Aug. 18, 2021.

International Preliminary Report on Patentability for International Application No. PCT/US2021/021041, dated Sep. 15, 2022.

* cited by examiner

*Primary Examiner* — Paul J Gray

(74) *Attorney, Agent, or Firm* — Wolf, Greenfield & Sacks, P.C.

(57) ABSTRACT

A gas source for pressuring sparkling and other beverage containers, e.g., to re-pressurize the container to keep a carbonation level of beverage during storage.

33 Claims, 11 Drawing Sheets

PRESSURIZED GAS SOURCE

RELATED APPLICATION

This application claims priority under 35 U.S.C. § 119(e) to U.S. Provisional Application Ser. No. 62/986,038 filed Mar. 6, 2020, which is herein incorporated by reference in its entirety.

BACKGROUND OF INVENTION

This invention relates generally to dispensing pressurized gas, e.g., for re-pressurizing a bottle of sparkling wine after pouring wine from the bottle.

SUMMARY OF INVENTION

One or more embodiments in accordance with aspects of the invention allow a user to dispense a beverage, such as wine, from a bottle or other container. In some cases, dispensing of liquid from such a bottle may be performed one or more times, and a stopper may be engaged with the bottle after each beverage dispensing to seal closed the interior of the bottle. Thus, the beverage may be dispensed from the bottle multiple times and stored for extended periods between each dispensing while minimizing effect on beverage quality. In some embodiments, little or no gas, such as air, which is reactive with the beverage, may be introduced into or remain in the bottle after dispensing of beverage from within the bottle. Thus, in some embodiments, a user may dispense wine from a wine bottle and subsequently purge air from the bottle and seal the bottle from air or other potentially damaging gasses or liquids entering into the bottle. In some embodiments, a pressure above ambient pressure may be introduced into and maintained in the bottle after dispensing is complete, which may help maintain a carbonation level in a sparkling beverage, and such pressure may be established by introducing pressurized gas through the stopper.

In one embodiment, a pressurized gas source for use in providing pressurized gas into a beverage container or other receptacle includes a housing with a support for a gas cylinder. The housing may be arranged to be held by hand, e.g., having a handle that can be gripped or provide aid in gripping by a user. A gas outlet may be mounted to the housing, e.g., at a bottom end of the housing, and arranged to provide the pressurized gas for delivery to the beverage container or other receptacle. For example, the gas outlet may be arranged with a valve so that pressing the housing downwardly onto a gas port of a gas receiving device (such as a stopper on a beverage container) moves a portion of the value upwardly and opens the valve to deliver gas. Removing downward force on the housing may cause the valve to close and stop gas delivery. A regulator may be supported by the housing and arranged to receive gas at a first pressure from the gas cylinder and to provide gas at a second pressure lower than the first pressure to the gas outlet. The regulator may be arranged in a variety of ways, such as having one or more pressure regulation stages, an adjustable output pressure, etc. A piercing lance may be arranged to pierce an outlet of the gas cylinder to release the pressurized gas, and may be fixed relative to the regulator. For example, the piercing lance may be attached to a valve body of the regulator. The regulator and the piercing lance may be movable relative to both the housing and the gas cylinder to pierce the outlet of the gas cylinder. Thus, the gas cylinder support may be arranged to hold the gas cylinder stationary relative to the housing during movement of the regulator and piercing lance to pierce the outlet of the gas cylinder. This arrangement may allow the gas source to accommodate a wide variety of differently sized and/or shaped gas cylinders because the cylinders need only be held in a stationary position in the housing to allow for effective and repeatable piercing.

In one embodiment, the housing includes a lever mounted for pivotal movement and that is coupled to move the regulator and piercing lance between retracted and piercing positions. For example, the lever may be movable between open and closed positions to cause the regulator and lance to move between retracted and piercing positions, respectively. In some embodiments, the lever defines an exterior surface of the housing, e.g., a user may grasp and move an exterior portion of the housing (the lever) to cause a gas cylinder to be pierced and/or released from the gas source. In one embodiment, the lever includes a cam that contacts and moves the regulator and piercing lance from the retracted position to the piercing position. In one example, the regulator may include a follower, such as a rail or other cam follower, which moves according to movement of the cam attached to the lever. The regulator and piercing lance may be spring biased to move to the retracted position, e.g., the lever may operate to move the regulator and lance toward the piercing position, and a spring may operate to move the regulator and lance toward the retracted position.

In one embodiment, the housing includes a door that is movable between open and closed positions to open and close a gas cylinder compartment. In some cases, the door may include a cylinder holder so that a user may place a cylinder in the holder on the door, and then close the door to load the cylinder in the housing of the gas supply. To accommodate differently sized cylinders, an adapter may receive a lower portion of the cylinder and the adapter and cylinder may be placed in the cylinder holder. The housing may include a latch to hold the door in the closed position, e.g., once the door is in the closed position, the door cannot be moved to the open position unless the latch is released. In some cases, the lever used to move the regulator and lance may be arranged to prevent operation of the latch to open the door when the lever is in the closed position. For example, in some cases the lever defines an exterior surface of the housing, and in the closed position the lever covers the latch. Thus, a user may have to move the lever to the open position to gain access to the latch so that the door for the gas cylinder compartment can be opened. This may help ensure that a cylinder in the housing is vented before the door is opened, e.g., movement of the lever will disengage the lance from the cylinder, allowing the cylinder to vent before the door is opened.

In some embodiments, the support for the gas cylinder includes a U-shaped plate arranged to receive a portion of a neck of the gas cylinder, and the support may be arranged to counter a piercing force of the piercing lance in piercing the outlet of the gas cylinder. That is, the support may not only hold the cylinder in the gas cylinder compartment but provide needed force on the cylinder to counter the force of the lance during piercing. In some embodiments, the gas cylinder may have a flange arranged at the neck of the cylinder, and the support may be arranged to receive the neck of the gas cylinder with the flange positioned on an upper surface of the support. Receipt of the neck and/or flange by the support may suitably position the cylinder in a vertical direction (e.g., parallel to the piercing direction) as well as lateral directions, e.g., transverse to the piercing direction. In some cases, the housing includes a gas cylinder holder arranged for movement between open and closed positions, and wherein the gas cylinder holder is arranged to position a portion of the gas cylinder on the support with movement to the closed position. For example, the cylinder holder may be mounted on a door so that the cylinder holder can receive a cylinder with the door in the open position, and so that the cylinder holder suitably positions the cylinder on the support when the door is moved to the closed position.

In some embodiments, the housing has an elongated shape with a top and a bottom, and the gas outlet is located at the bottom of the housing. The support for the gas cylinder may be arranged to support the gas cylinder with the outlet of the gas cylinder located at an uppermost part of the gas cylinder. That is, the gas cylinder may be oriented vertically with the gas outlet of the cylinder located above other portions of the cylinder. This allows the gas outlet to be placed over a gas receiving component and to dispense gas while the cylinder is oriented vertically. This arrangement may be useful for use with carbon dioxide cylinders, which may contain liquid and gas forms of carbon dioxide. By orienting the cylinder vertically, liquid carbon dioxide may be prevented from exiting the cylinder during use. In addition, or alternately, to orienting the gas cylinder with the gas outlet located at an uppermost portion of the gas cylinder during gas dispensing, gas received from the gas cylinder may be routed or otherwise carried in an upward direction, and then downwardly to the gas outlet of the pressurized gas source. As an example, a conduit that receives gas from the gas cylinder may carry gas upwardly during dispensing, and then turn downwardly to the gas outlet of the pressurized gas source. This may help prevent liquid received from the gas cylinder from reaching the gas outlet of the pressurized gas source, which could cause freezing of some components such as a gas outlet valve. That is, carbon dioxide is often contained in a gas cylinder in liquid and gas forms. If liquid carbon dioxide is received by the conduit, routing the flow upwardly and then downwardly can help keep liquid from reaching the downward segment of the conduit and thus keep the liquid from reaching the gas outlet of the pressurized gas source.

In one embodiment, a pressurized gas source includes a housing including a support for a gas cylinder holding the pressurized gas, a piercing lance arranged to pierce an outlet of the gas cylinder to release the pressurized gas, and a gas outlet mounted to the housing, fluidly coupled to the piercing lance and arranged to provide the pressurized gas for delivery to the beverage container. A door may be movable between open and closed positions on the housing to open and close a gas cylinder compartment, and an actuator may be arranged to move the piercing lance and the gas cylinder relative to each other to cause the piercing lance to pierce the outlet of the gas cylinder. The actuator may have a piercing state in which the lance and gas cylinder are engaged and a retracted state in which the lance and gas cylinder are disengaged. For example, the actuator may include a lever arranged to move the lance and gas cylinder relative to each other based on movement of the lever between open and closed positions. The door may be prevented from movement from the closed position unless the actuator is in the disengaged state, e.g., the gas cylinder compartment may be locked in the closed position and cannot be moved unless the lever is moved to the open position. In some cases, the lever may define an exterior surface of the housing and may cover at least a part of the door in the closed position, preventing opening of the door.

In one embodiment, a gas cylinder includes a body having a storage volume and a neck with a top surface having a piercable gas outlet. A flange may be secured to the neck, e.g., extending radially outwardly from the neck, and arranged to support the gas cylinder for piercing of the gas outlet. Thus, the flange may receive forces from the support of a gas supply necessary to counter the piercing force of the lance. A cap may be secured to the neck and have a sidewall extending around the top surface and defining an inner space and an upper opening to the inner space. A gasket may be located in the inner space and arranged to form a seal with the top surface and form a seal with a piercing element that extends into the inner space to pierce the gas outlet.

In some cases, the flange and the cap are made as single unitary piece, while in other cases the flange is made as one piece with the body and separately from the cap. In some embodiments, the sidewall of the cap is arranged to extend above the top surface of the neck. For example, the sidewall may be located at an upper portion of the cap and a lower portion of the cap may include an internal thread arranged to engage with an external thread on the cylinder neck. The gasket may have an upper surface with a region of the upper surface being exposed at the upper opening of the cap. The upper surface of the gasket may be arranged to contact the piercing element received in the upper opening of the cap to pierce the gas outlet of the cylinder, and a lower surface arranged to form the seal with the top surface of the neck. In some embodiments, the cap includes an upper wall having an annular shape that extends radially inwardly from the sidewall and includes a radially inner part that defines the upper opening. The gasket may have an uppermost part of an upper surface located radially inward of the radially inner part of the upper wall, e.g., so the uppermost part is exposed at the upper opening for contact with the piercing lance. In some cases, the uppermost part of the upper surface of the gasket may extend into the upper opening. The inner space of the cap may have a cylindrical shape and the gasket may have a torus shape, although other shapes are possible. Contact of the piercing element with the gasket may cause the gasket to change shape and to at least partially conform to the shape of the inner space defined by the cap and the piercing element. In some embodiments, the upper opening in the cap may be operable to engage a piercing element and prevent rotation of the gas cylinder relative to the piercing element.

In one embodiment, a stopper is provided for use with a beverage container having a neck, an opening at the neck to access an internal volume of the container, and a lip on an outer surface of the neck. The stopper may include a stopper body having a sealing surface arranged to contact and form a seal with a portion of the neck around the opening, e.g., to seal the interior space of the bottle from gasses or other external environmental conditions. The stopper may include a gas inlet port arranged to receive pressurized gas from the gas outlet of the gas source and deliver the pressurized gas into the interior space of the container. The stopper may be arranged to seal the opening of the container to hold or otherwise suitably maintain a pressure above ambient in the container, e.g., to help keep a carbonation level of the beverage at a suitable level. For example, the stopper may include a gas pathway that extends from a gas inlet port to a gas outlet. The gas pathway may extend from a top of the stopper body where the gas inlet port is located to a location adjacent the sealing surface where the gas outlet is located to introduce pressurized gas into the container. A check valve or other one-way valve may be provided in the gas pathway to prevent flow from the gas outlet to the inlet. A vent and/or pressure indicator may be provided with the stopper as well, e.g., to vent pressure over a threshold level to allow purging of air from a bottle and indicate a pressure in the bottle.

Various exemplary embodiments of the device are further depicted and described below.

BRIEF DESCRIPTION OF THE DRAWINGS

Aspects of the invention are described with reference to various embodiments, and to the figures, which include:

FIG. 3 shows a cross sectional view of the FIG. 1 gas source along the line 3-3 in

FIG. 1

DETAILED DESCRIPTION

Aspects of the invention are described below with reference to illustrative embodiments, but it should be understood that aspects of the invention are not to be construed narrowly in view of the specific embodiments described. Thus, aspects of the invention are not limited to the embodiments described herein. It should also be understood that various aspects of the invention may be used alone and/or in any suitable combination with each other, and thus various embodiments should not be interpreted as requiring any particular combination or combinations of features. Instead, one or more features of the embodiments described may be combined with any other suitable features of other embodiments. For example, the embodiment of a gas supply below includes a regulator and lance that are movable relative to the housing and gas cylinder, as well as a door of a gas cylinder compartment that can be opened only after a lever that operates a piercing operation is moved to an open position. These features may be used independently of each other, e.g., the gas cylinder door feature may be used in a gas supply that moves a cylinder relative to the housing for piercing, and vice versa.

Figure 1:
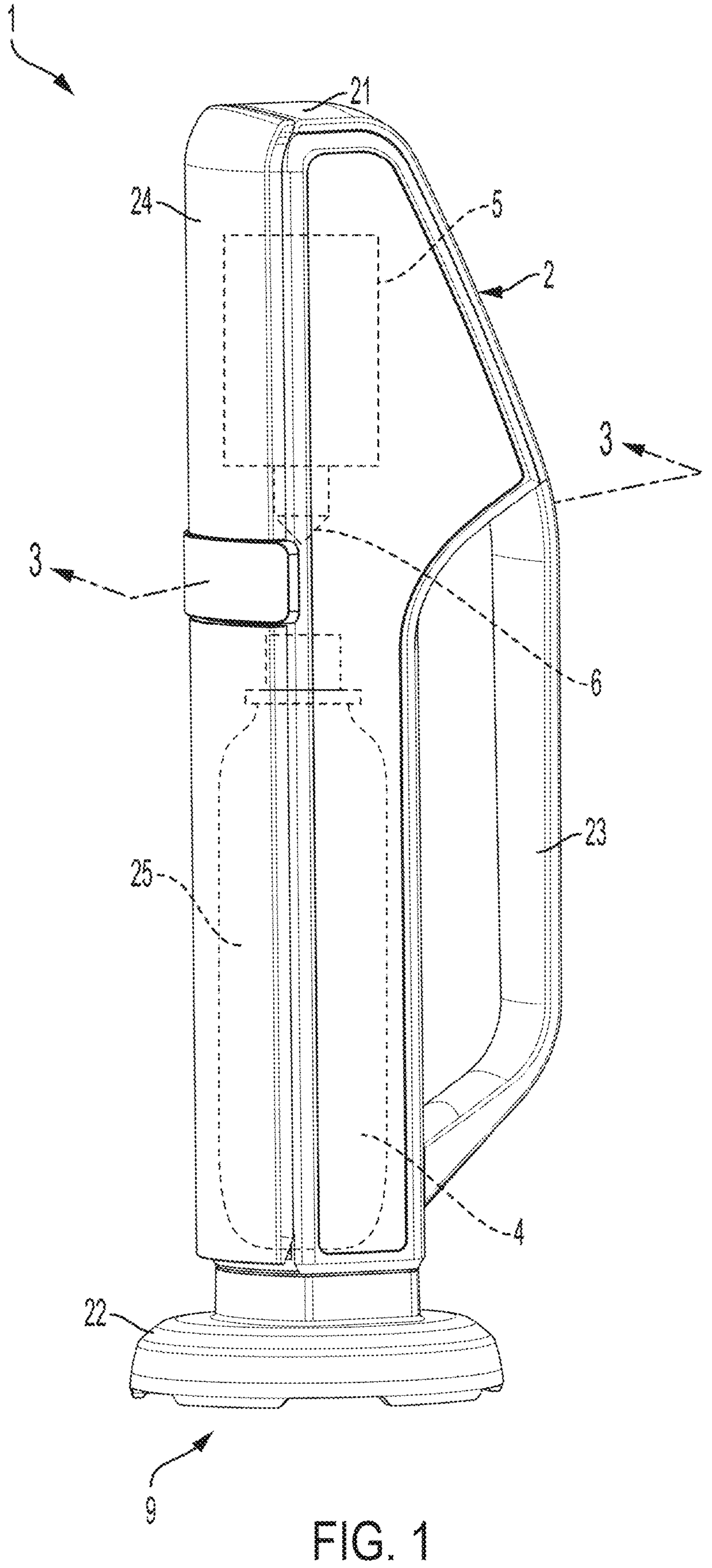
FIG. 1 shows a front, right perspective view of a gas source in an illustrative embodiment.
Figure 2:
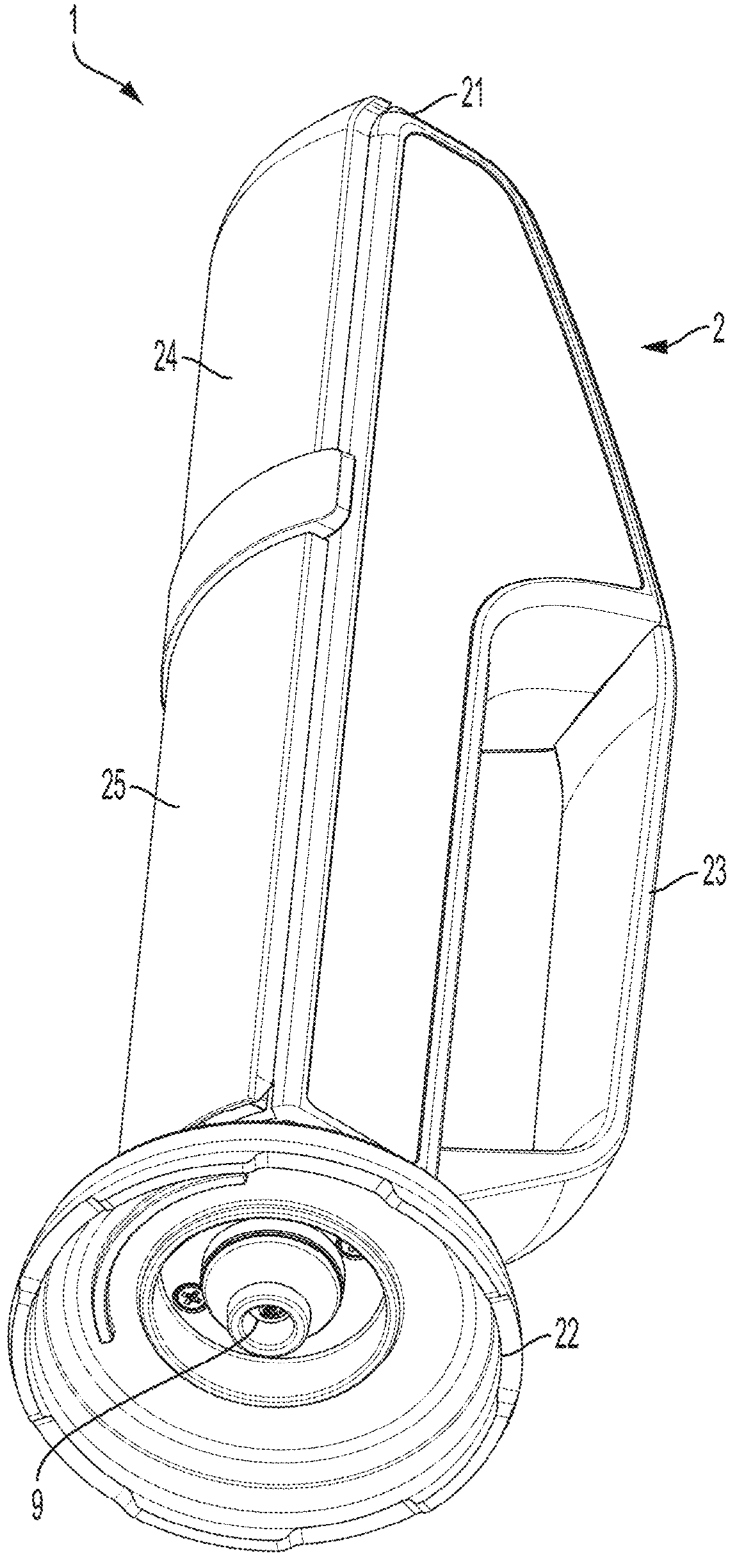
FIG. 2 shows a bottom, right perspective view of the FIG. 1 gas source.

FIG. 1 shows a perspective view of a gas source 1 that may be used for various applications, such as inflating tires, pressurizing or re-pressurizing sparkling wine and other carbonated beverage bottles after dispensing, charging accumulators, etc. In the description below, use in pressurizing carbonated beverage containers is specifically referenced but aspects of the invention should not be limited to this application. The gas source 1 has a housing 2 that supports various components of the gas source 1. In this embodiment, the housing 2 has an elongated shape having a top 21 and a bottom 22, and a handle 23 that a user may grip to manipulate the gas source 1. For example, a user may extend fingers through the opening of the handle 23 and grip the main body of the housing 2 with fingers and thumb. Of course, the housing 2 is not limited to an elongated shape, and may take other suitable forms. In this embodiment, the gas source 1 has a gas outlet 9 located at the bottom 22 the housing 2, which is best seen in FIG. 2. This positioning for the gas outlet 9 may allow a user to place the gas source 1 over a gas receiving port (such as an inflation valve) and press the gas source 1 downwardly over the receiving port to deliver gas. In this embodiment, the gas outlet 9 is arranged with a valve that is normally closed, and opens to permit gas flow when the gas outlet 9 is pressed downwardly on a receiving port (which moves a portion of the gas outlet valve upwardly, toward the housing 2). Releasing the gas source 1 from the receiving port will close the gas outlet valve, stopping gas flow. However, in other embodiments, gas may be released by a user operating a lever or button, squeezing the handle 23, or in other ways.

Figure 3:
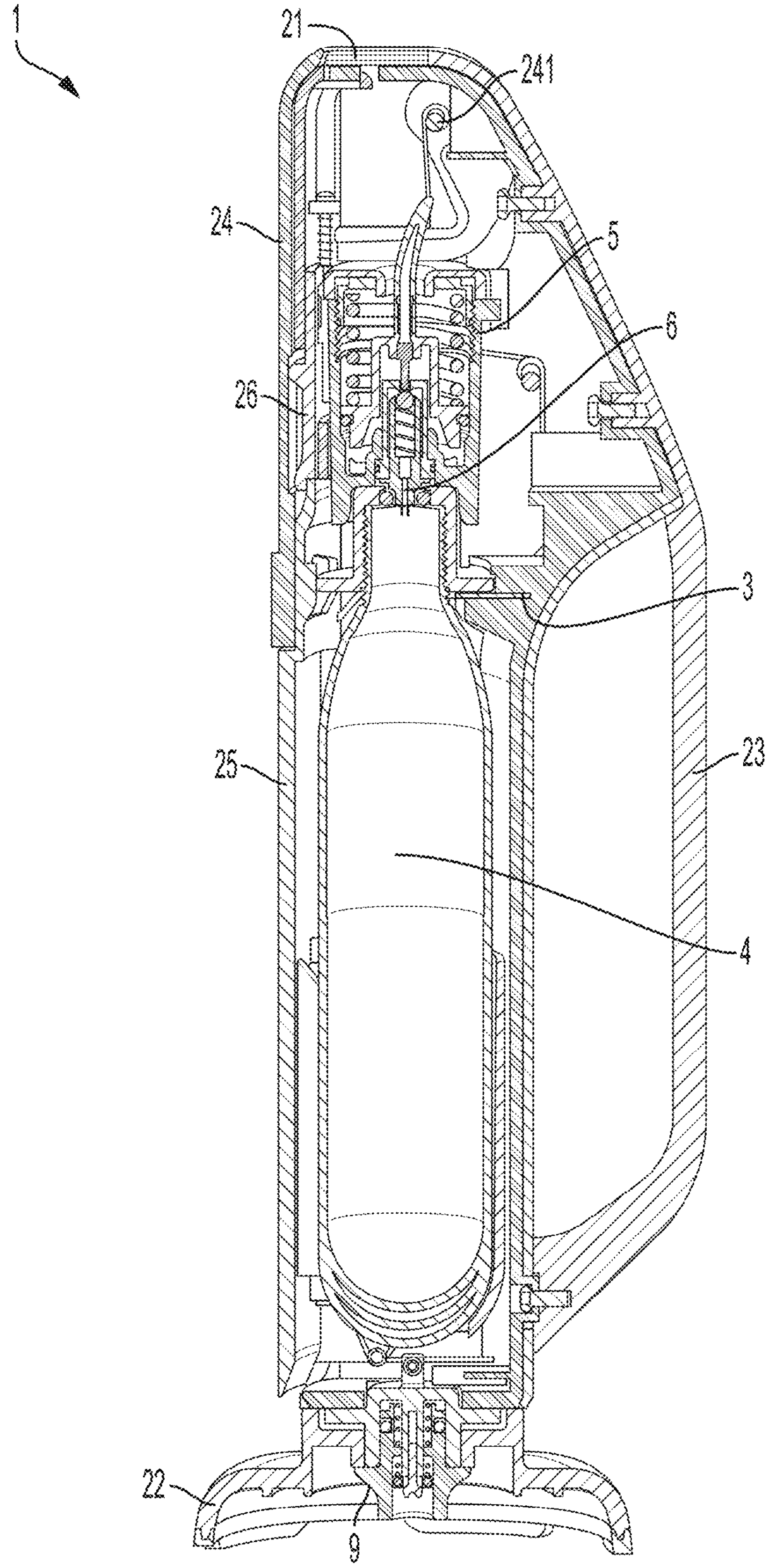
Figure 7:
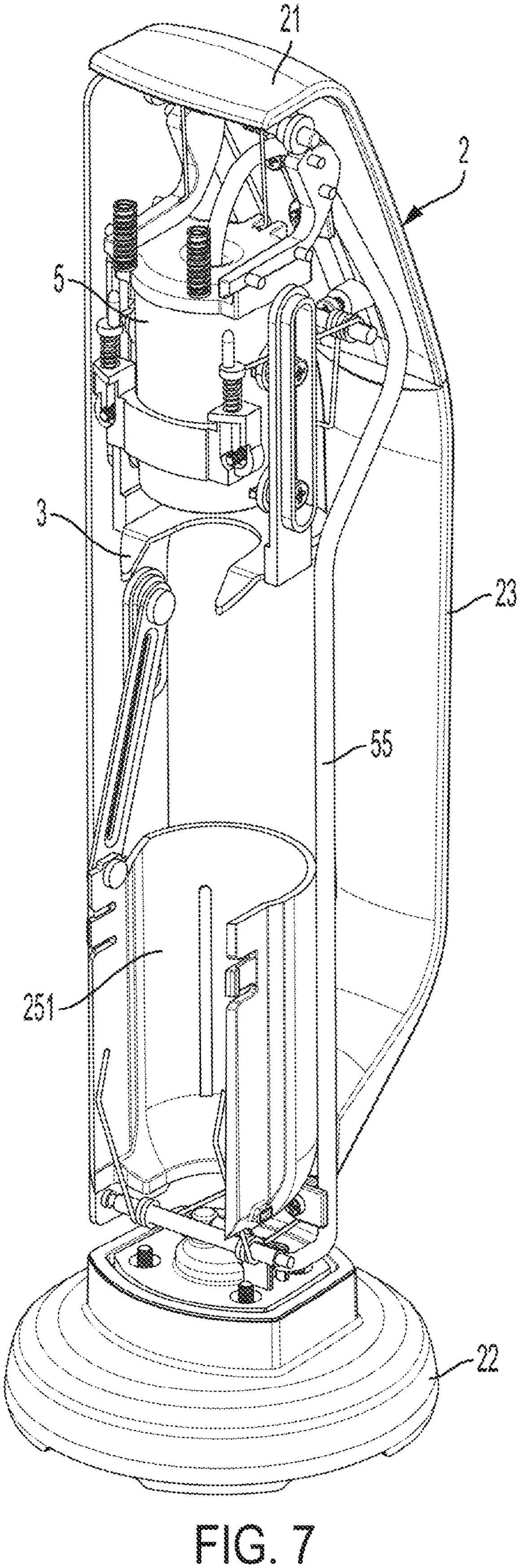
FIG. 7 shows a perspective view of the gas source with the lever, door and side portions of the housing removed.

As shown in FIGS. 1 and 3, the gas source 1 includes a gas cylinder 4 that holds pressurized gas in a storage volume, a piercing lance 6 to pierce a gas outlet of the cylinder 4, and a regulator 5 to receive high pressure gas from the cylinder 4 and reduce its pressure for delivery to the gas outlet 9 (e.g., via a tube or other conduit 55—see FIG. 7). For example, a gas cylinder 4 holding carbon dioxide may have an internal pressure of 500 to 1000 psi, and the regulator 5 may reduce this pressure to something suitable for the intended application, such as 15 to 50 psi for re-pressurizing a sparkling beverage container. In some cases, the regulator 5 may be adjustable by a user or technician to provide different gas pressures at the gas outlet 9. For example, the regulator 5 may include a dial, adjustable screw, or other feature used to adjust the output gas pressure. In accordance with an aspect of the invention, the regulator 5 and piercing lance 6 may be fixed together and moved relative to the housing 2 and the gas cylinder 4 to pierce the gas cylinder outlet. This may be done in different ways, such as that described below, and can enable the gas source 1 to use differently sized and shaped gas cylinders 4 because the size and shape of the cylinder is not relevant to the piercing operation as is the case in most gas cylinder piercing arrangements. That is, many gas cylinder piercing configurations support a bottom of the cylinder, opposite the gas outlet, for piercing. As a result, variations in cylinder length, shape or other features can interfere with proper piercing. However, in this arrangement where a regulator and piercing lance are move toward a cylinder that remains stationary during piercing relative to the housing, cylinder size and/or shape is not important to the process.

Figure 4:
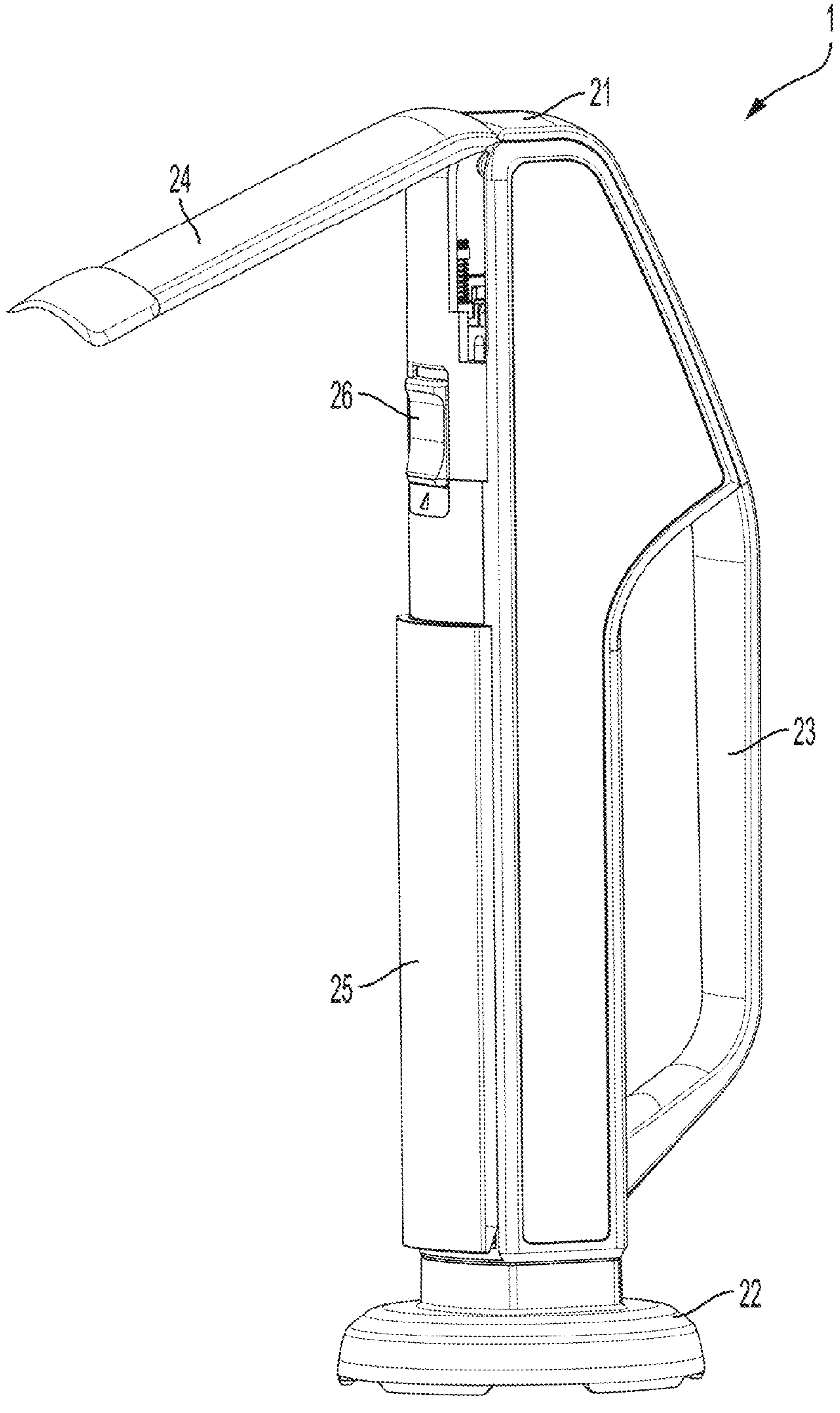
FIG. 4 shows a perspective view of the gas source with a lever in an open position.

The gas source 1 may include an actuator to cause the lance to pierce the gas cylinder. In this embodiment, the actuator includes a lever 24 that is mounted for pivotal movement about a pivot axis 241, which can be seen in FIG. 3. FIGS. 1-3 show the lever 24 in a closed position, while FIG. 4 shows the lever 24 in an open position. Movement of the lever 24 drives movement of the regulator 5 and the piercing lance 6 relative to the gas cylinder 4, i.e., up and down movement in the FIGS. 1 and 3 view. With the lever 24 in the closed position, the regulator 5 and piercing lance 6 are in a downward position, or advanced position nearest to the gas cylinder 4 outlet. Thus, with the lever 24 in the closed position, the piercing lance 6 will pierce the gas outlet of the gas cylinder 4 as is the case in FIG. 3. With the lever 24 in the open position of FIG. 4, the regulator 5 and lance 6 are in an upward position, or retracted position away from the gas cylinder outlet. This, for example, can allow the gas cylinder 4 to be removed from the housing 2 for replacement by another cylinder 4. A detailed embodiment regarding a mechanism by which the lever 24 moves the regulator 5 and lance 6 is described below, but various actuator arrangements may be employed, such as linkages, drives, and other devices to move the regulator 5 and lance 6 in response to lever 24 movement. For example, a two bar linkage may be employed where an end of a first link is pivoted to the housing 2 above the regulator 5, an end of a second link is pivoted to the regulator 5/lance 6, and the other ends of the links are pivotally coupled together. The lever 24 may be attached to the ends of the links that are coupled together so that movement of the lever 24 causes a scissors action of the links that moves the regulator 5/lance 6 up and down. Another arrangement may include a gear drive whereby rotation of the lever 24 rotates a pinion gear, which causes a rack coupled to the regulator 5/lance 6 to move up and down with lever 24 movement. Other variations will occur to those of skill in the art, including motor drives that may be actuated by a user pressing a button, etc. Not also that in some embodiments, the regulator and lance are not fixed together and the actuator may be arranged to move the lance and gas cylinder relative to each other, e.g., move the gas cylinder relative to the lance, which remains stationary relative to the housing. Thus, an actuator may have a piercing state in which the lance and cylinder are engaged, and a retracted state in which the lance and cylinder are not engaged.

Figure 5:
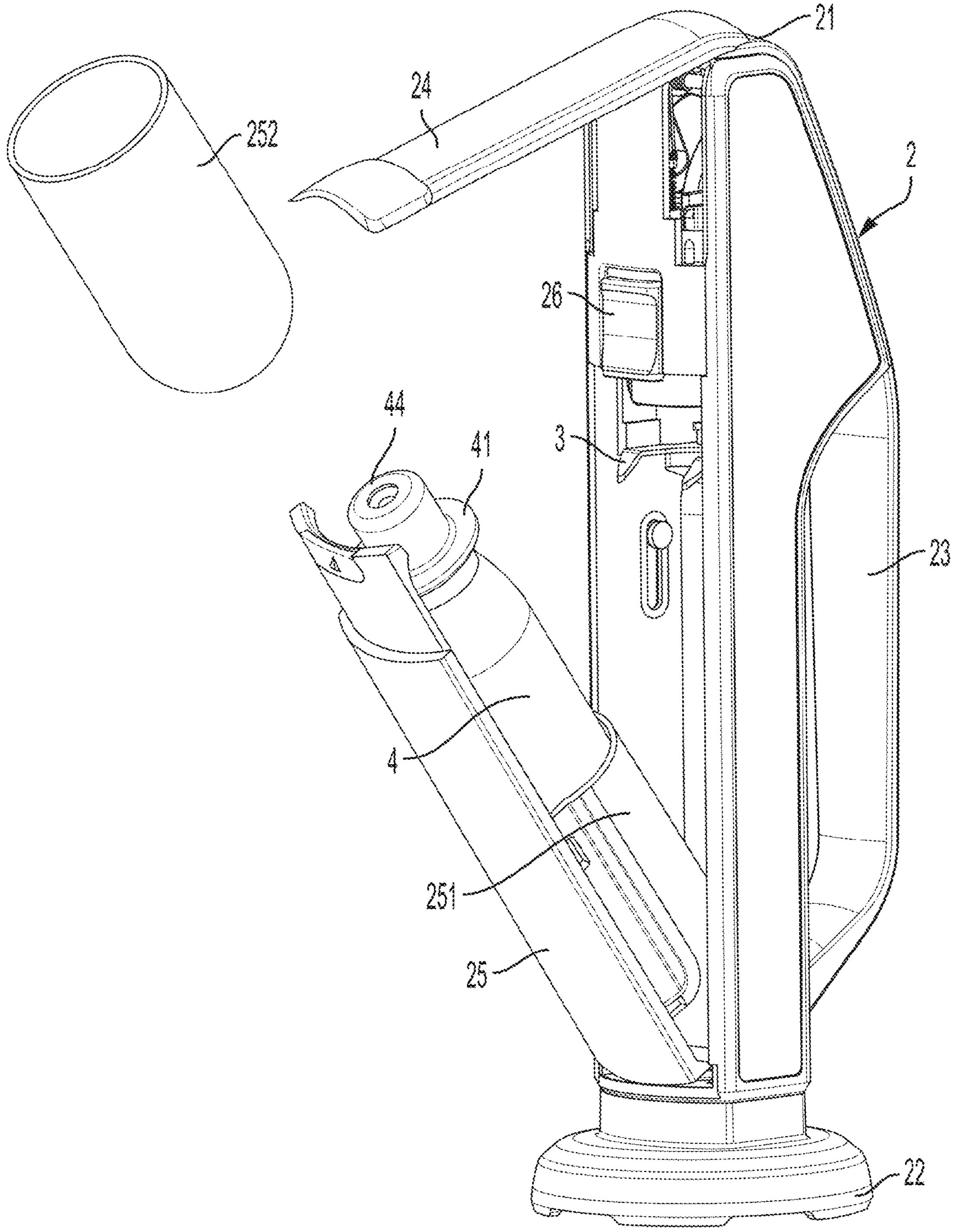
FIG. 5 shows a perspective view of the gas source with the lever in the open position and a door and gas cylinder compartment in an open position.

Although not required, in this embodiment a portion of the lever 24 defines an external surface of the housing 2. This may enable a user to more easily identify the function of the lever 24, as well as access the lever 24. In addition, this may enable to the lever 24 to control whether and how a gas cylinder is removed from, or provided to the gas source 1. For example, in this embodiment, the gas source 1 includes a door 25 that covers a gas cylinder compartment where the gas cylinder 4 is located. The door 25 is movable between the closed position in FIG. 4 and an open position in FIG. 5. However, to move the door 25 from the closed position, a latch 26 must be released (e.g., slid upwardly against a spring bias) so that the door 25 can be opened. As can be seen in FIGS. 1 and 3, however, the lever 24 covers the latch 26 when the lever 24 is in the closed position, preventing access to the latch 26. Thus, the gas cylinder compartment cannot be opened unless the lever 24 is first moved to the open position. Of course, moving the lever 24 to the open position moves the lance 6 away from the gas cylinder 4, allowing any gas pressure in the cylinder 4 and/or the regulator 5 to be vented. As a result, any time a user wishes to open the gas cylinder compartment (i.e., open the door 25) the lever 24 must first be opened, which causes the gas cylinder 4 and associated gas lines to be vented to ambient pressure. This can help ensure that a user does not handle a cylinder 4 during venting, which could cause problems. For example, carbon dioxide cylinders often cool to relatively low temperatures if gas is vented rapidly from the cylinder. Venting a cylinder before allowing a user to open a gas cylinder compartment may delay handling of the cylinder, allowing the cylinder to warm before being touched by a user.

In this embodiment, the door 25 is pivotally mounted near the bottom 22 of the housing 2 so that the door 25 can pivot forwardly and downwardly to expose the gas cylinder compartment. The door 25 includes a cylinder holder 251 on an inner side, allowing a cylinder 4 to be placed on the inner side of the door 25 and the door 25 moved to the closed position to mount the cylinder 4 in the gas cylinder compartment. The cylinder holder 251 is arranged to hold multiple different sizes and shapes of cylinders 4, including cylinders 4 of different lengths. In some cases, an adapter 252 may be used with a cylinder 4, e.g., where the cylinder 4 is smaller than a typical or nominal size. In such a case, the cylinder 4 may be placed in the adapter 252, and the combination adapter/cylinder placed into the cylinder holder 251. The door 25 may then be moved to the closed position to place the cylinder 4 in the gas cylinder compartment of the housing 2.

The cylinder compartment includes a support 3 to hold the cylinder 4 in the gas cylinder compartment. In this embodiment, the support 3 is arranged to support the gas cylinder 4 with the outlet of the gas cylinder located at an uppermost part of the gas cylinder 4. That is, the gas cylinder 4 is oriented vertically with the outlet of the cylinder located above other portions of the cylinder. This arrangement may be useful for use with carbon dioxide cylinders, which may contain liquid and gas forms of carbon dioxide. By orienting the cylinder vertically, liquid carbon dioxide may be prevented from exiting the cylinder during use. In addition, or alternately, to orienting the gas cylinder with the gas outlet located at an uppermost portion of the gas cylinder during gas dispensing, gas received from the gas cylinder 4 may be routed or otherwise carried in an upward direction, and then downwardly to the gas outlet 9. For example, the regulator 5 and conduit 55 direct fluid received from the gas cylinder 4 upwardly in an initial flow path, and then the conduit 55 turns downwardly to the gas outlet 9. This may help prevent liquid received from the gas cylinder 4 from reaching the gas outlet 9, which could cause freezing of some components such as a gas outlet valve. That is, if liquid carbon dioxide is received by the conduit 55, routing the flow upwardly and then downwardly can help keep liquid from reaching the downward segment of the conduit and thus keep the liquid from reaching the gas outlet of the pressurized gas source. In some cases, the initial upward flow path may help prevent liquid from reaching an uppermost part of the conduit 55, e.g., because liquid is more dense than gas. Also, the upward, then downward flow path of the conduit 55 may increase the overall length of the flow path, helping to warm any liquid in the conduit 55 so the liquid evaporates to a gas in the conduit 55.

Figure 6:
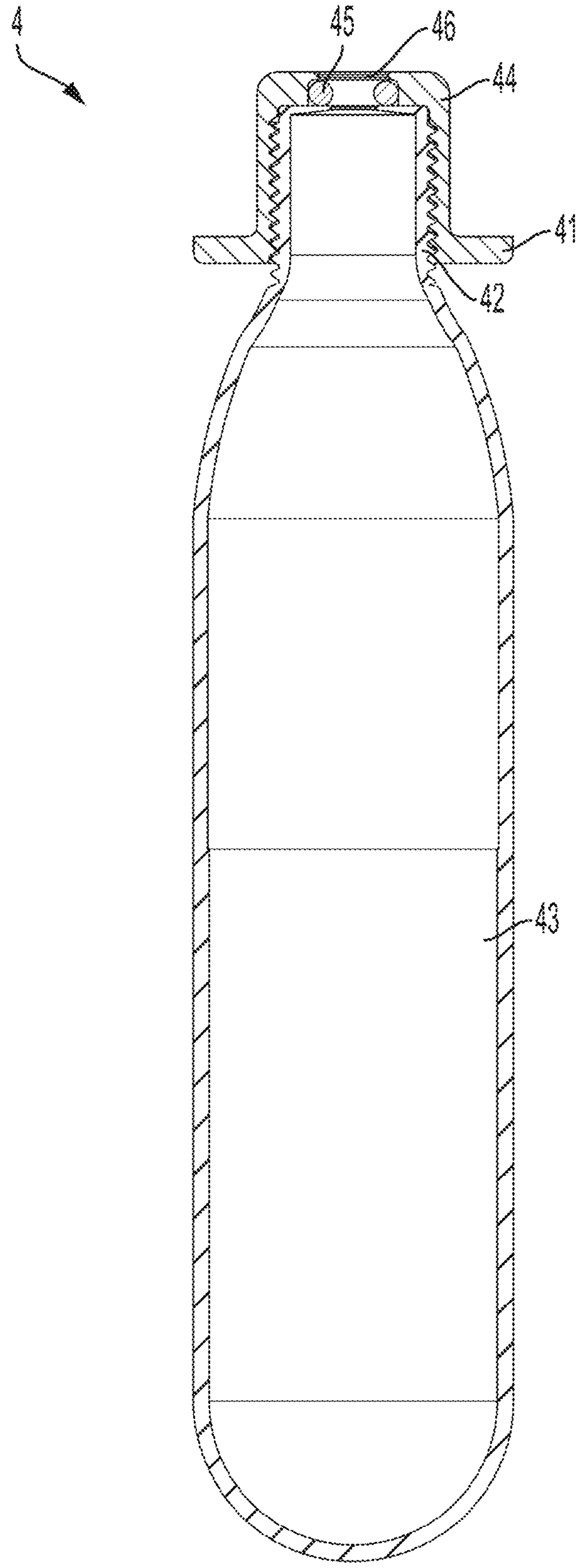
FIG. 6 shows a cross sectional view of a gas cylinder in an illustrative embodiment.

The support 3 for the gas cylinder 4 may also be arranged to counter the force applied by the piercing lance 6 during piercing. That is, the force required to pierce the gas outlet of the cylinder 4 may vary, but in some cases may be relatively high, e.g., 10 lbs or more. The support 3 may provide all necessary counter force on the cylinder 4 to allow for effective piercing by the lance 6, e.g., the support 3 may prevent movement of the cylinder 4 relative to the housing during piercing. The support 3 may engage with the cylinder 4 in different ways, such as by engaging with a neck of the cylinder, a cap engaged with the cylinder neck, etc., and in this embodiment the support 3 is arranged to engage with a flange that is attached to the cylinder neck. FIG. 6 shows a cylinder 4 in one illustrative embodiment that includes a flange 41 suitable to arrange the cylinder 4 on the support 3 of the gas source 1. In this embodiment, the flange 41 extends radially outwardly from the neck 42 of the cylinder body 43, which has a storage volume for holding pressurized gas. The flange 41 in this embodiment is made as a single unitary part with a cap 44, but may be made as a single unitary part with the body 43 or neck 42. Alternately, the flange 41 may be attached to other parts of the cylinder by a threaded connection, welding, adhesive, etc. The cap 44 in this embodiment has a sidewall with a lower portion that engages with the neck 42, e.g., by a threaded connection, adhesive, press fit, etc., and an upper portion that extends above a top surface of the neck 42 where the piercable gas outlet is located. The upper portion of the sidewall defines an inner space where a gasket 45 is located. The inner space can be accessed by an upper opening 46, e.g., defined by an upper end of the sidewall and/or by a radially inward extending wall portion. An upper surface of the gasket 45 may be at least partially exposed at the upper opening of the cap 44, and may extend into the upper opening 46. The upper surface may be arranged to form a seal with the piercing lance 6 that extends into the upper opening, and a lower surface of the gasket 45 may form a seal with the top surface of the neck. Thus, when the lance 6 extends into the upper opening of the cap 44, the lance 6 may form a seal with the gasket 45, as well as cause the lower surface of the gasket 45 to form a seal with the top surface of the neck 42 and pierce the gas outlet of the cylinder to release pressurized gas. Contact of the piercing lance 6 with the gasket 45 causes the gasket to change shape and to at least partially conform to the shape of the inner space defined by the cap 44 as well as to the shape of the piercing lance 6. In some cases, the upper opening 46 in the cap 44 may be operable to engage the piercing lance 6 and prevent rotation of the gas cylinder 4 relative to the piercing lance 6, e.g., the upper opening may include grooves that engage with ribs on the lance 6 that prevent rotation of the cap 44 relative to the lance 6.

When a cylinder 4 like that in FIG. 6 is placed in the cylinder holder 251 of the door 25 and the door 25 is closed, the neck 42 of the cylinder 4 is received by the support 3 so that the flange 41 of the cylinder 4 is positioned above the support 3. This allows the support 3 to hold the cylinder against vertical forces, such as gravity on the cylinder 4, as well as piercing forces of the lance 6. As can be seen in FIG. 7, the support 3 includes a U-shaped plate that can receive the cylinder neck 42 within the U-shaped opening and contact an underside of the flange 41. Leading ends of the U-shaped portion are ramped or angled so that the flange 41 can be guided to the top side of the support 3 when the door 25 is closed. The support 3 may also engage the flange 41 to position the gas outlet laterally, in horizontal directions or directions transverse to the piercing direction, so that the gas outlet is properly positioned to be pierced by the lance 6. To do so, the support 3 may engage with the outer radial surface of the flange 41, and/or engage with the outer radial surface of the neck 42, e.g., receipt of the neck 42 fully into the U-shaped opening of the support 3 may properly position the gas outlet for piercing.

Figure 8:
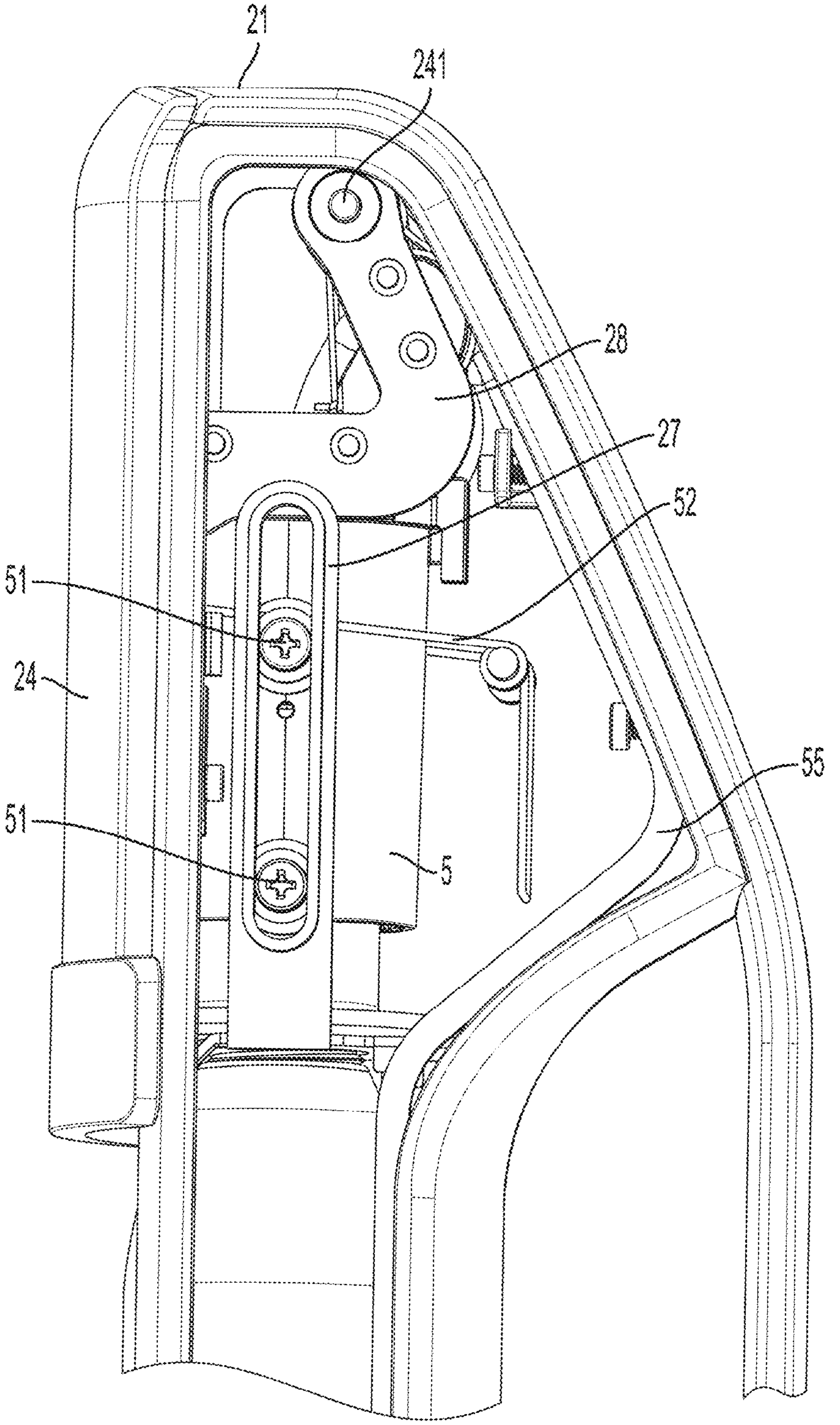
FIG. 8 shows a close up side view of the lever, regulator and piercing lance with a portion of the housing removed.
Figure 9:
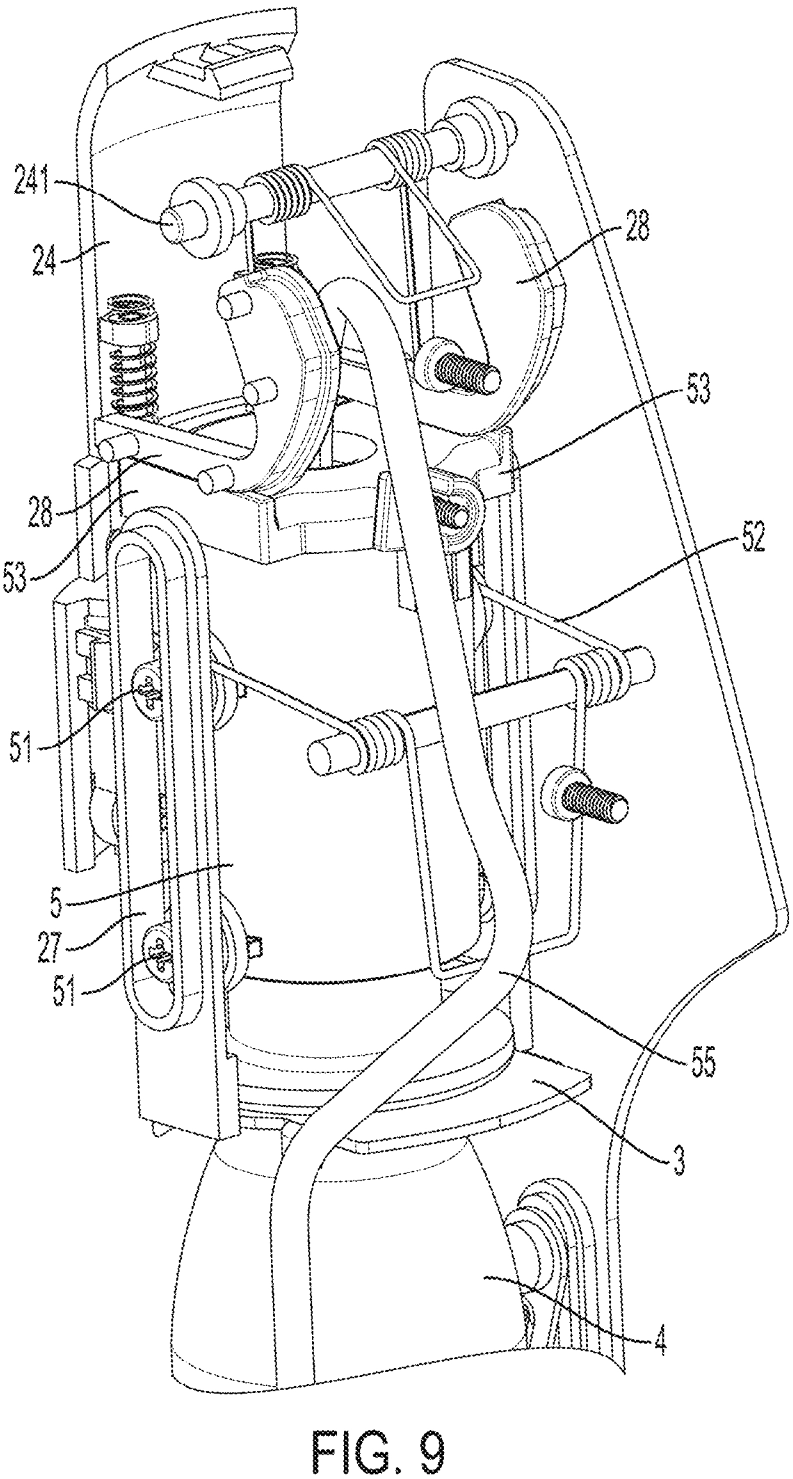
FIG. 9 shows a close up rear view of the lever, regulator and piercing lance with a portion of the housing removed.

FIG. 8 shows a close up view of the regulator 5 and lance 6, illustrating how they are moved relative to the housing 2 and cylinder 4 in this embodiment. The housing 2 includes a pair of rails 27 (only one is shown in FIG. 8) that guide vertical movement of the regulator 5 and lance 6. The rails 27 each include an elongated slot, and a pair of pins 51 attached to the regulator 5 ride in the slot to guide movement of the regulator. A spring 52 is arranged to bias the regulator 5 to move upwardly and away from the cylinder 4 so that in the absence of any downward force on the regulator 5, the regulator 5 and lance 6 will move upwardly and away from the cylinder 4. Downward force is applied to the regulator 5 and lance 6 by the lever 24 by way of a cam 28 that is fixed to the lever 24. Therefore, as the lever 24 is pivoted relative to the housing 2, the cam 28 pivots as well. FIG. 9 shows a close up view of the cam 28 and regulator 5. The cam 28 has a groove that engages with a follower 53 on the regulator 5, which in this embodiment has a straight rail configuration. As the lever 24 and cam 28 pivot about the lever pivot axis 241, the cam 28 will ride along the follower 53. For example, as the cam 28 and lever 24 pivot toward the open position from the closed position shown in FIG. 9, the follower 53 will contact portions of the cam 28 progressively nearer the pivot axis 241. Since the spring 52 continuously biases the regulator 5 to move upwardly, this movement of the cam 28 allows the regulator 5 and lance 6 to move upwardly and away from the cylinder 4. Conversely, as the cam 28 is moved from the open position to the closed position, the cam 28 will push downwardly on the follower 53, causing the regulator to move downwardly until the lance 6 pierces the cylinder gas outlet. The cam 28 has an over-center feature such that once the lever 24 and cam 28 are in the closed position, upward force on the regulator 5/lance 6 (whether by the spring 52, the gasket 45 and/or by the cylinder's resistance to piercing) will not cause the lever 24 to move from the closed position. Only a user's lifting of the lever 24 will operate to move the lever 24 from the closed position.

Figure 10:
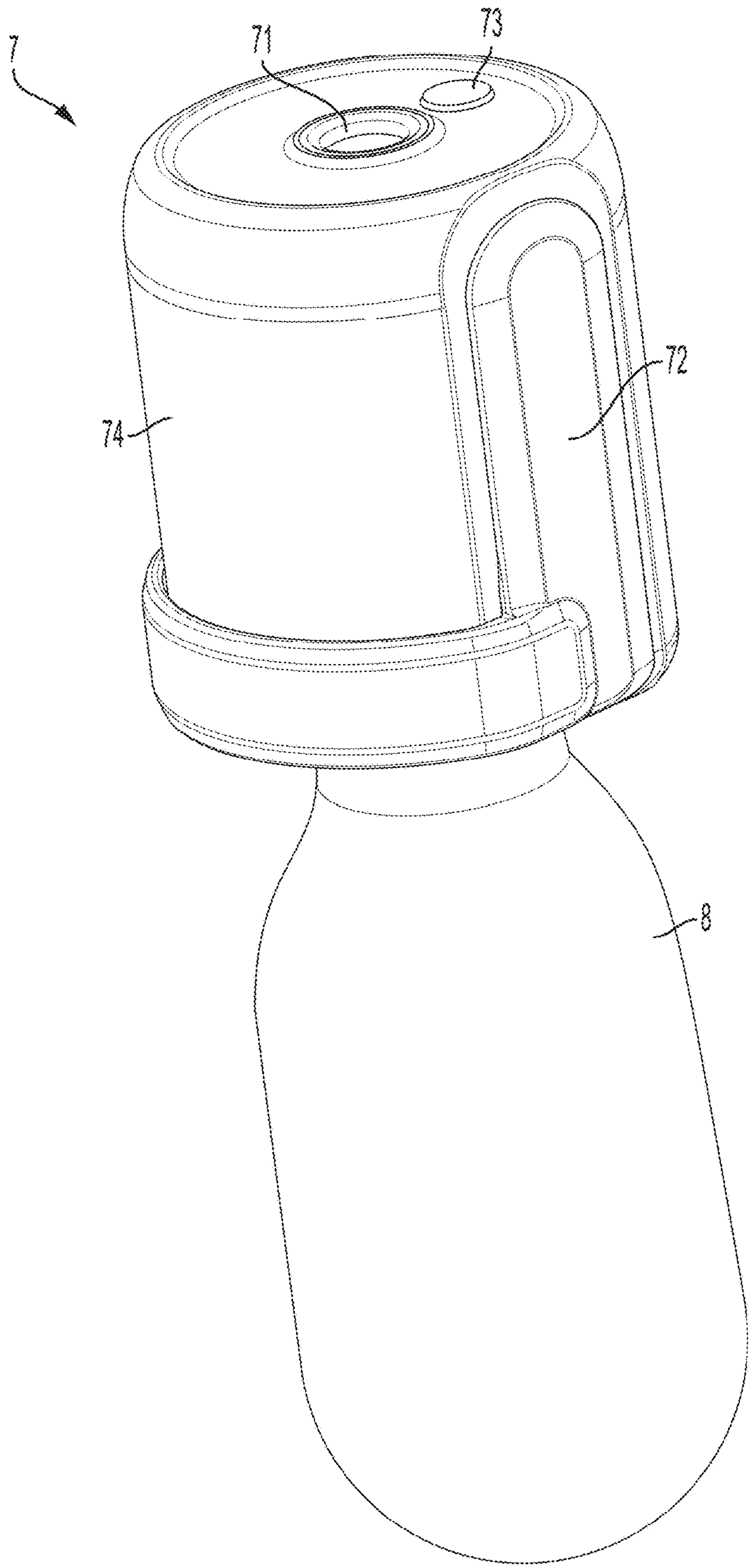
FIG. 10 shows a perspective view of a stopper arranged for use with the gas source to introduce pressure into a container.
Figure 11:
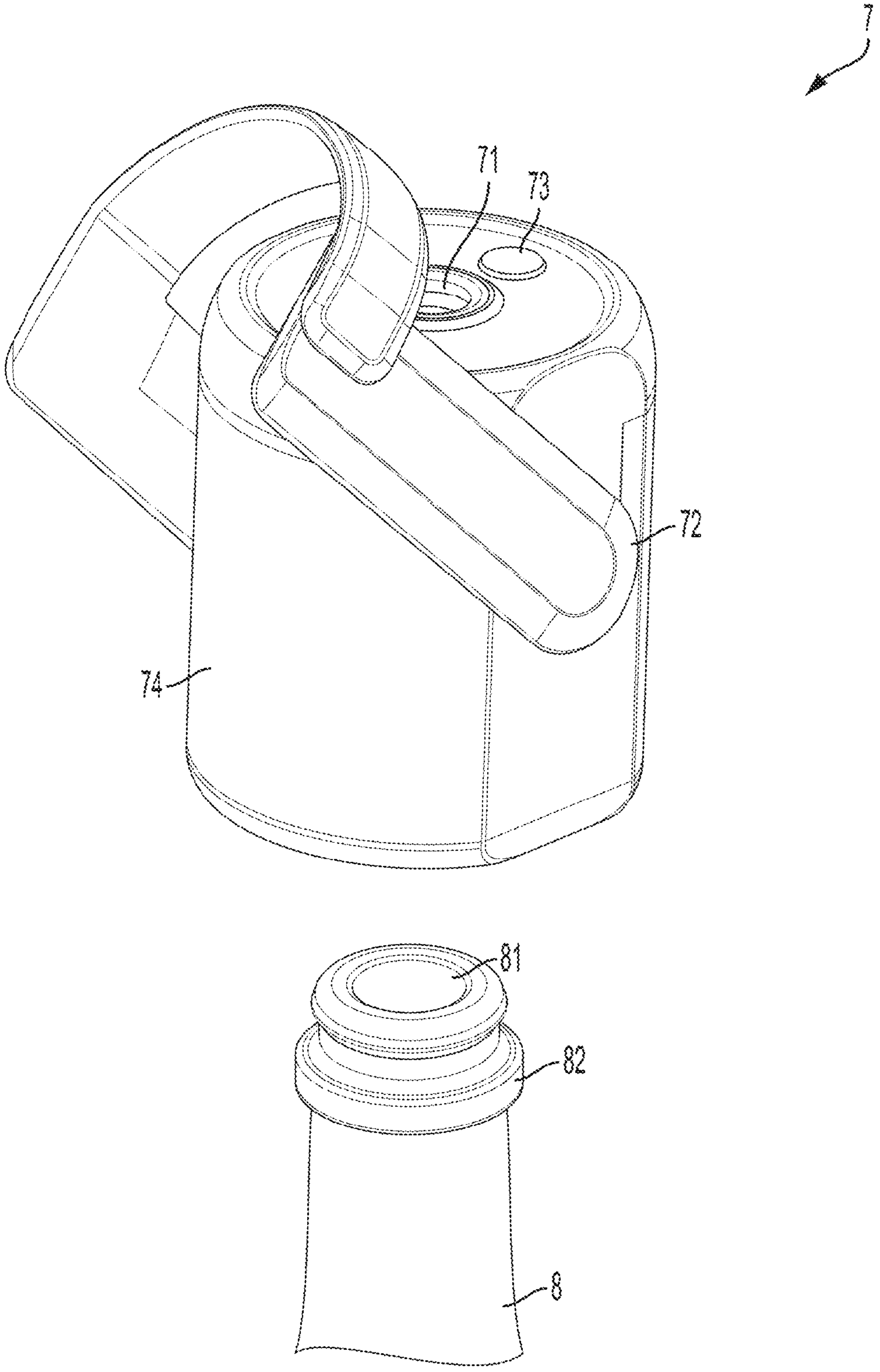
FIG. 11 shows the stopper of FIG. 10 disengaged from a container.

As noted above, the gas source 1 may be used to re-pressurize carbonated beverage containers after the containers are opened to dispense a beverage. To introduce pressurized gas into the container, a stopper may be used to deliver the pressurized gas and hold the interior space of the container under pressure for an extended period. FIGS. 10 and 11 show a stopper 7 for use with a container 8, such as a container 8 that holds a sparkling beverage and that initially has a cork or other closure that seals an opening 81 of the container 8. Thus, the cork or other closure may be removed from the opening 81 to allow pouring of beverage from the container and the stopper 7 may be used to re-seal or close the opening 81. As discussed more below, the stopper 7 may permit the interior space of the container 8 to be pressurized, e.g., so that a carbonated beverage may remain carbonated during storage with the stopper 7, but this is not required. As is the case with many sparkling and other wine bottles, the neck of the container includes a lip 82 below the opening 81 that is used to engage with a metal cap and wire retainer or other component that helps keep the cork or other closure in the opening 81. With the cork retainer and the cork or other closure removed as shown in FIG. 11, the opening 81 of the container 8 is open for dispensing beverage. Thereafter, the stopper 7 may be engaged with the container 8 to seal the opening 81 closed as shown in FIG. 10, and later removed as shown in FIG. 11 to permit further dispensing of beverage from the container 8. To engage with the container 8, a handle 72 may be operated between open and closed positions (shown in FIGS. 10 and 11, respectively) so that a suitably arranged mechanism may engage with the lip 82 of the container 8 and seal the opening 81 closed. With the stopper 7 engaged with the container 8 as in FIG. 10, a user may introduce pressurized gas into the interior space of the container 8. In this embodiment, the stopper 7 includes a gas inlet port 71 at a top of the stopper housing 74 that can be mated with the gas outlet 9 of the gas source 1. As described above, pressing downwardly on the gas source housing 2 may open the gas outlet 9, delivering gas to the inlet port 71 of the stopper and into the container 8. The stopper 7 may include a pressure indicator 73, e.g., that provides an indication when pressure in the container 8 is at a suitable level and gas deliver can stop. As will be understood, the inlet port 71 may communicate with a gas pathway that extends through the stopper 7 and to a location where gas is delivered to the interior space of the container 8. A check valve or other valve arrangement may permit gas flow into the container 8 but resist flow from the container 8 to the inlet port 71. To re-pressurize a carbonated beverage container, the gas source 1 may include a cylinder of pressurized CO2 and may be fluidly coupled to the gas inlet port 71 by a quick-connect type fitting, threaded fitting, press fit or other suitable engagement such as simply having a user hold the gas source 9 against the inlet port 71. The gas source may include a pressurized gas container, such as a gas cylinder that holds a suitable gas (carbon dioxide, nitrogen, argon, etc.) under relatively high pressure such as 100-3000 psi. The gas source may be arranged to provide gas at two or more selectable pressures and/or flow rates, if desired. For example, gas may be provided at a first pressure and/or first flow rate, e.g., to displace any air in the container 8 with a suitably inert or non-reactive gas from the gas source. Displaced air may be vented through the stopper 7 via a vent. In some cases, a vent may be manually operated by a user, e.g., by pressing a button. A second pressure and/or second flow rate may be higher than the first pressure and may be suitable to establish a storage pressure in the container 8, e.g., to help maintain a desired carbonation level in the container 8. Since the stopper 7 may seal the opening 81 of the container closed, an above-ambient pressure may be maintained in the container 8 internal space for an extended period, such as 1 day, 1 week, 1 month or more. The gas inlet port 71 or other portion of the gas inlet pathway may include a check valve or other one-way valve that allows gas flow into the container 8 but resists gas flow out of the container 8. In addition or alternately, the gas inlet port 71 may be capped or otherwise closed to prevent pressure leakage.

While aspects of the invention have been shown and described with reference to illustrative embodiments, it will be understood by those skilled in the art that various changes in form and details may be made therein without departing from the scope of the invention encompassed by the appended claims.

The invention claimed is:

1. A pressurized gas source for use in providing pressurized gas into a beverage container, the gas source comprising:

a housing including a lever mounted for pivotal movement and a support for a gas cylinder holding the pressurized gas, the support being arranged to hold the gas cylinder so an outlet of the gas cylinder is positioned above other portions of the gas cylinder;

a gas outlet mounted to the housing below the outlet of the gas cylinder held by the support for the gas cylinder and arranged to provide the pressurized gas for delivery to the beverage container;

a regulator supported by the housing and arranged to receive gas at a first pressure from the gas cylinder and to provide gas at a second pressure lower than the first pressure to the gas outlet; and a piercing lance arranged to pierce the outlet of the gas cylinder to release the pressurized gas, the piercing lance being fixed relative to the regulator, and the regulator and the piercing lance being movable between retracted and piercing positions relative to the housing and the gas cylinder to pierce the outlet of the gas cylinder, wherein the lever includes a cam to contact and move the regulator and piercing lance from the retracted position to the piercing position, and wherein the regulator and piercing lance are spring biased to move to the retracted position.

2. The gas source of claim 1, wherein the gas cylinder support is arranged to hold the gas cylinder stationary relative to the housing during movement of the regulator and piercing lance to pierce the outlet of the gas cylinder.

3. The gas source of claim 1, wherein the lever defines an exterior surface of the housing.

4. The gas source of claim 1, wherein the housing includes a door that is movable between open and closed positions to open and close a gas cylinder compartment.

5. The gas source of claim 4, wherein the housing includes a latch to hold the door in the closed position.

6. The gas source of claim 5, wherein the lever is mounted for pivotal movement between open and closed positions to move the regulator and piercing lance between the retracted and piercing positions, and wherein the lever in the closed position prevents operation of the latch to open the door.

7. The gas source of claim 6, wherein the lever defines an exterior surface of the housing, and in the closed position the lever covers the latch.

8. The gas source of claim 1, wherein the support for the gas cylinder includes a U-shaped plate arranged to receive a portion of a neck of the gas cylinder.

9. The gas source of claim 8, wherein the support for the gas cylinder is arranged to counter a piercing force of the piercing lance in piercing the outlet of the gas cylinder.

10. The gas source of claim 9, further comprising the gas cylinder having a flange arranged at the neck of the cylinder, and wherein the support for the gas cylinder is arranged to receive the neck of the gas cylinder with the flange positioned on an upper surface of the support.

11. The gas source of claim 1, wherein the housing includes a gas cylinder holder arranged for movement between open and closed positions, and wherein the gas cylinder holder is arranged to position a portion of the gas cylinder on the support with movement to the closed position.

12. The gas source of claim 11, wherein the gas cylinder holder is attached to a door of the housing that is movable between closed and open positions.

13. The gas source of claim 1, wherein the housing has an elongated shape with a top and a bottom, the gas outlet is located at the bottom of the housing and the support for the gas cylinder is arranged to support the gas cylinder with the outlet of the gas cylinder located at an uppermost part of the gas cylinder and located nearer the top of the housing than the bottom of the housing.

14. The gas source of claim 13, wherein the regulator and piercing lance are arranged to move vertically to pierce the gas cylinder.

15. The gas source of claim 1, wherein the housing includes a gas cylinder holder adapted to receive a first gas cylinder having a first size in an adapter, and to receive a second gas cylinder having a second size that is larger than the first size without the adapter.

16. The gas source of claim 1, wherein the gas outlet includes a valve that is normally closed and is configured to open by pressing a portion of the valve downwardly onto an inlet port of a container stopper.

17. The gas source of claim 1, wherein the housing has an elongated shape with a top and a bottom, and the gas outlet is located at the bottom of the housing.

18. The gas source of claim 1, wherein the gas outlet includes a valve that is normally closed and is opened by moving a portion of the valve upwardly.

19. A pressurized gas source for use in providing pressurized gas into a beverage container, the gas source comprising:

a housing including a door that is movable between open and closed positions to open and close a gas cylinder compartment, a latch to hold the door in the closed position and a support for a gas cylinder holding the pressurized gas, the support being arranged to hold the gas cylinder so an outlet of the gas cylinder is positioned above other portions of the gas cylinder;

a gas outlet mounted to the housing below the outlet of the gas cylinder held by the support for the gas cylinder and arranged to provide the pressurized gas for delivery to the beverage container;

a regulator supported by the housing and arranged to receive gas at a first pressure from the gas cylinder and to provide gas at a second pressure lower than the first pressure to the gas outlet; and a piercing lance arranged to pierce the outlet of the gas cylinder to release the pressurized gas, the piercing lance being fixed relative to the regulator, and the regulator and the piercing lance being movable relative to the housing and the gas cylinder to pierce the outlet of the gas cylinder, wherein the housing includes a lever that defines an exterior surface of the housing and is mounted for pivotal movement between open and closed positions, the lever being coupled to move the regulator and piercing lance between retracted and piercing positions, and wherein the lever in the closed position covers the latch and prevents operation of the latch to open the door.

20. The gas source of claim 19, wherein the lever includes a cam that contacts and moves the regulator and piercing lance from the retracted position to the piercing position.

21. The gas source of claim 20, wherein the regulator and piercing lance are spring biased to move to the retracted position.

22. The gas source of claim 19, wherein the gas cylinder support is arranged to hold the gas cylinder stationary relative to the housing during movement of the regulator and piercing lance to pierce the outlet of the gas cylinder.

23. The gas source of claim 19, wherein the support for the gas cylinder includes a U-shaped plate arranged to receive a portion of a neck of the gas cylinder.

24. The gas source of claim 23, wherein the support for the gas cylinder is arranged to counter a piercing force of the piercing lance in piercing the outlet of the gas cylinder.

25. The gas source of claim 24, further comprising the gas cylinder having a flange arranged at the neck of the cylinder, and wherein the support for the gas cylinder is arranged to receive the neck of the gas cylinder with the flange positioned on an upper surface of the support.

26. The gas source of claim 19, wherein the housing includes a gas cylinder holder arranged for movement between open and closed positions, and wherein the gas cylinder holder is arranged to position a portion of the gas cylinder on the support with movement to the closed position.

27. The gas source of claim 26, wherein the gas cylinder holder is attached to the door of the housing.

28. The gas source of claim 19, wherein the housing has an elongated shape with a top and a bottom, the gas outlet is located at the bottom of the housing and the support for the gas cylinder is arranged to support the gas cylinder with the outlet of the gas cylinder located at an uppermost part of the gas cylinder and located nearer the top of the housing than the bottom of the housing.

29. The gas source of claim 28, wherein the regulator and piercing lance are arranged to move vertically to pierce the gas cylinder.

30. The gas source of claim 19, wherein the housing includes a gas cylinder holder adapted to receive a first gas cylinder having a first size in an adapter, and to receive a second gas cylinder having a second size that is larger than the first size without the adapter.

31. The gas source of claim 19, wherein the gas outlet includes a valve that is normally closed and is configured to open by pressing a portion of the valve downwardly onto an inlet port of a container stopper.

32. The gas source of claim 19, wherein the housing has an elongated shape with a top and a bottom, and the gas outlet is located at the bottom of the housing.

33. The gas source of claim 19, wherein the gas outlet includes a valve that is normally closed and is opened by moving a portion of the valve upwardly.

* * * * *